(12) United States Patent
Sivakumar et al.

(10) Patent No.: US 10,915,356 B2
(45) Date of Patent: Feb. 9, 2021

(54) TECHNOLOGY TO AUGMENT THREAD SCHEDULING WITH TEMPORAL CHARACTERISTICS

(71) Applicant: Intel Corporation, Santa Clara, CA (US)

(72) Inventors: Ramakrishnan Sivakumar, Hillsboro, OR (US); Vijay Dhanraj, Beaverton, OR (US); Russell Fenger, Beaverton, OR (US); Guy Therien, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 106 days.

(21) Appl. No.: 16/117,091

(22) Filed: Aug. 30, 2018

(65) Prior Publication Data
US 2019/0042307 A1 Feb. 7, 2019

(51) Int. Cl.
*G06F 9/46* (2006.01)
*G06F 9/48* (2006.01)
*G06F 9/50* (2006.01)

(52) U.S. Cl.
CPC .......... *G06F 9/4881* (2013.01); *G06F 9/5027* (2013.01); *G06F 9/5033* (2013.01); *G06F 9/5038* (2013.01); *G06F 2209/503* (2013.01)

(58) Field of Classification Search
CPC .... G06F 9/4881; G06F 9/5027; G06F 9/5038; G06F 9/5033; G06F 2209/503
See application file for complete search history.

(56) References Cited

U.S. PATENT DOCUMENTS

| | | | | |
|---|---|---|---|---|
| 2009/0070772 A1* | 3/2009 | Shikano | ............... | G06F 9/5027 718/106 |
| 2009/0249094 A1* | 10/2009 | Marshall | ............... | G06F 1/3203 713/320 |
| 2013/0124451 A1* | 5/2013 | Das | ........................ | G06N 5/02 706/56 |
| 2014/0181825 A1* | 6/2014 | He | ........................ | G06F 9/5027 718/102 |
| 2014/0196050 A1* | 7/2014 | Yu | ........................ | G06F 9/5088 718/104 |
| 2014/0282504 A1* | 9/2014 | O'Donnell | .......... | G06F 9/45558 718/1 |
| 2016/0191407 A1* | 6/2016 | Dvorkin | .................... | G06F 9/00 709/226 |
| 2017/0060629 A1* | 3/2017 | Vora | ...................... | G06F 9/4881 |
| 2019/0222514 A1* | 7/2019 | Nimmagadda | ......... | H04L 45/74 |

* cited by examiner

*Primary Examiner* — Emerson C Puente
*Assistant Examiner* — Zhi Chen
(74) *Attorney, Agent, or Firm* — Jordan IP Law, LLC

(57) ABSTRACT

Systems, apparatuses and methods may provide for technology that identifies a thread and selects a core from a plurality of processor cores in response to the selected core being available while satisfying a least used condition with respect to the plurality of processor cores. The technology may also schedule the thread to be executed on the selected core.

25 Claims, 6 Drawing Sheets

TECHNOLOGY TO AUGMENT THREAD SCHEDULING WITH TEMPORAL CHARACTERISTICS

TECHNICAL FIELD

Embodiments generally relate to thread scheduling in computing systems. More particularly, embodiments relate to technology that augments thread scheduling with temporal characteristics.

BACKGROUND

Conventional approaches to scheduling threads for execution in multi-processor/core computing systems may result in certain processors being used more often than others. The more heavily used processors may wear over time, which may in turn reduce performance (e.g., maximum frequency capability), reliability and/or efficiency.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
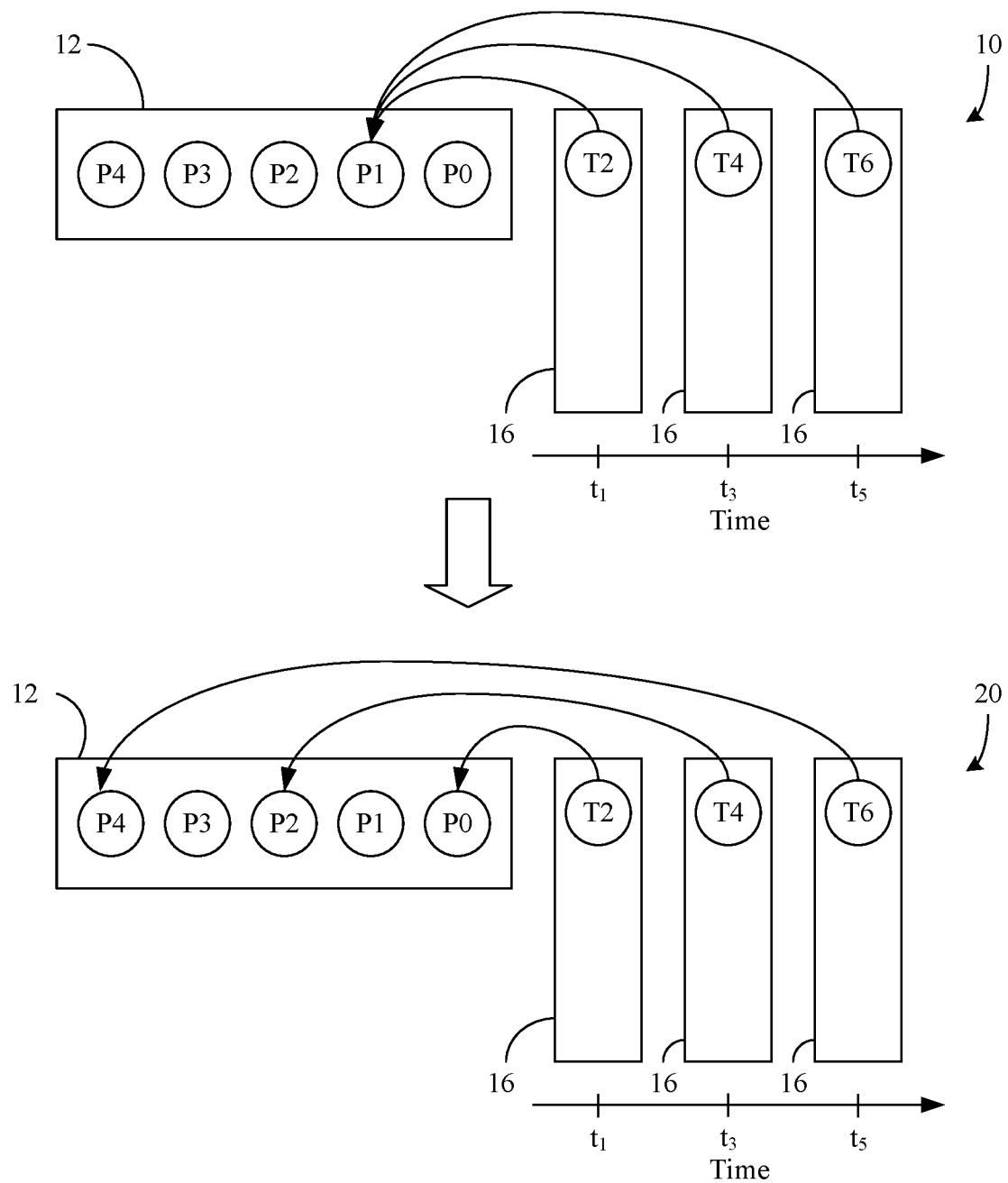
FIG. 1 is an illustration of an example of a comparison between a conventional thread scheduling solution and a thread scheduling solution according to an embodiment.

Turning now to FIG. 1, a conventional approach 10 to scheduling threads for execution on a plurality of processor cores 12 ("P0" through "P4") is shown. The conventional approach 10 may be limited to a throughput-oriented scheduling policy that selects a target core solely based on processor availability and the throughput requirements of the thread and/or overall system. In the illustrated example, at time instance ti, a thread T2 is at the top of a thread ready queue 16 and the thread T2 is scheduled for execution on a processor core P1. Similarly, at a time instance $t_3$, a thread T4 is at the top of the thread ready queue 16 and the thread T4 is scheduled for execution on the processor core P1. At an illustrated time instance $t_5$, a thread T6 is at the top of the thread ready queue 16 and the thread T6 is scheduled for execution on the processor core P1. Thus, all three threads T2, T4 and T6 are scheduled on the same processor core P1, while the remaining processor cores P0 and P2-P4 remain unused, in the illustrated conventional approach 10. Accordingly, the conventional approach 10 may be considered a non-deterministic solution that causes the processor core P1 to wear over time more quickly than the remaining processor cores P0 and P2-P4. As such, the illustrated processor core P1 experiences reduced performance (e.g., maximum frequency capability), reliability and/or efficiency.

By contrast, an enhanced approach 20 to scheduling threads takes into consideration temporal characteristics such as, for example, the historical active time of each of the processor cores 12. More particularly, at time instance ti, the thread T2 is at the top of the thread ready queue 16 and the thread T2 is scheduled for execution on a processor core P0 because the processor core P0 is identified as the least used processor at the time instance ti. Similarly, at a time instance $t_3$, the thread T4 is at the top of the thread ready queue 16 and the thread T4 is scheduled for execution on the processor core P2 because the processor core P2 is identified as the least used processor at the time instance $t_3$. At an illustrated time instance $t_5$, the thread T6 is at the top of the thread ready queue 16 and the thread T6 is scheduled for execution on the processor core P4 because the processor core P4 is identified as the least used processor at the time instance $t_5$. Thus, all three threads T2, T4 and T6 are scheduled on different processor cores in the illustrated enhanced approach 20. Accordingly, the enhanced approach 20 may be considered a deterministic solution that prevents any one of the processor cores 12 from wearing over time significantly more quickly than the remaining processor cores 12. As such, the illustrated processor cores 14 experience enhanced performance (e.g., increased maximum frequency capability), reliability and/or efficiency.

More particularly, in the enhanced approach 20 connections are less likely to break down due to less cycling between expansion (e.g., due to current flow and heat) and contraction (e.g., due to cooling) in any one of the processor cores 14. Additionally, frequency capping is less likely because processor wear and overheating is less of a concern. Simply put, as the workload thread migrates from one core to another, all of the processor cores 12 have enough time to cool down before being used again.

Figure 2:
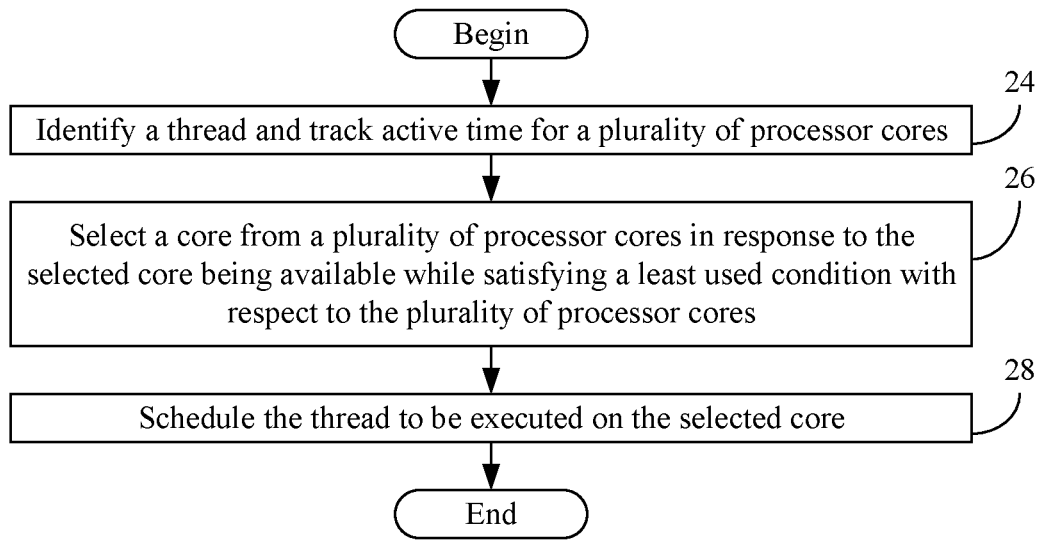
FIG. 2 is a flowchart of an example of a method of managing threads according to an embodiment.

FIG. 2 shows a method 22 of managing threads. The method 22 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 22 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 24 provides for identifying a thread and tracking active time for a plurality of processor cores. In one example, block 24 includes accessing a thread ready queue such as, for example, the thread ready queue 16 (FIG. 1) to determine which thread is at the top of the queue. The active time may be tracked for each processor by, for example, identifying (e.g., via time stamp, snap shot, etc.) an idle state exit event for the processor core (e.g., BeginActive), identifying (e.g., via time stamp, snap shot, etc.) an idle entry event for the processor core (e.g., EndActive), and determining the active time as ActiveTime=EndActive−BeginActive, where TotalActiveTime=TotalActiveTime+ActiveTime. The active time data may be maintained in real-time in a suitable location (e.g., memory, register, etc.). Other approaches to tracking active state (e.g., C0 state of the ACPI/Advanced Configuration and Power Interface Specification) residency may be used. Block 24 may also include sorting the plurality of processor cores on an active time basis.

A core (e.g., target core) may be selected from the plurality of processor cores at block 26 in response to the selected core being available while satisfying a least used condition with respect to the plurality of processor cores. As will be discussed in greater detail, the least used condition may include the selected core being associated with the lowest active time among the plurality of processor cores. In another example, the least used condition includes the selected core being in a least used affinity set (e.g., a subset/group of processor cores associated with relatively low active times). Moreover, in a heterogeneous processing environment, the core may be selected from cores of the same core type. The thread is scheduled to be executed on the selected core at illustrated block 28. Block 28 may include, for example, updating a scheduling data structure to include the selected core, signaling the selection results to the selected core, activating one or more clock circuits and/or power rails associated with the selected core, and so forth. Thus, every time a core is selected for a ready thread, the least used cores are given higher preference/priority over other available cores. This approach ensures that the cores not only operate within their safe thermal range (e.g., reaching higher frequencies without being thermally constrained), but wear uniformly and therefore exhibit greater reliability.

As already noted, the illustrated method 22 may be considered a deterministic solution that prevents any one of the processor cores from wearing over time more quickly than the remaining processor cores. As such, the processor cores experience enhanced performance (e.g., increased maximum frequency/turbo capability), reliability and/or efficiency. For example, connections are less likely to break down in the method 22 due to less cycling between expansion (e.g., due to current flow and heat) and contraction (e.g., due to cooling) in any one of the processor cores. Additionally, frequency capping is less likely because processor wear and overheating is less of a concern. The enhanced performance resulting from the method 22 renders the method 22 particularly useful in high operating frequency and/or throughput applications such as gaming applications.

Figure 3:
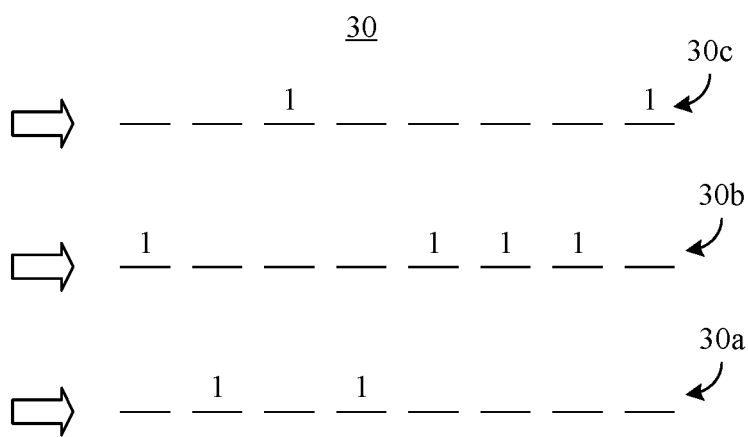
FIG. 3 is an illustration of an example of a plurality of affinity sets and a corresponding plurality of affinity masks according to an embodiment.

Turning now to FIG. 3, a plurality of affinity sets 32 (32a-32c) and a corresponding plurality of affinity masks 30 (30a-30c) is shown. In the illustrated example, a plurality of processor cores ("P0" to "P7") are sorted on an active time basis. Moreover, the processor cores may be organized into groups based on their respective active times. Thus, a first subset 32a ("P4" and "P6") of the processor cores may be associated with a "least used" affinity, a second subset 32b ("P7", "P1", "P2" and "P3") of the processor cores might be associated with a "moderately used" affinity, a third subset 32c ("P0", and "P5") of the processor cores may be associated with a "most used" affinity, and so forth. The illustrated affinity sets 32 are converted into the affinity masks on a per bit basis. More particularly, a first affinity mask 30a includes set bits four and six (e.g., corresponding to processor cores "P4" and "P6"), a second affinity mask 30b includes set bits seven, one, two and three (e.g., corresponding to processor cores "P7", "P1", "P2" and "P3"), a third affinity mask 30c includes set bits zero and five (e.g., corresponding to processor cores "P0", and "P5"), and so forth. As will be discussed in greater detail, the illustrated approach reduces the overhead associated with checking the active times of individual processor cores.

Figure 4:
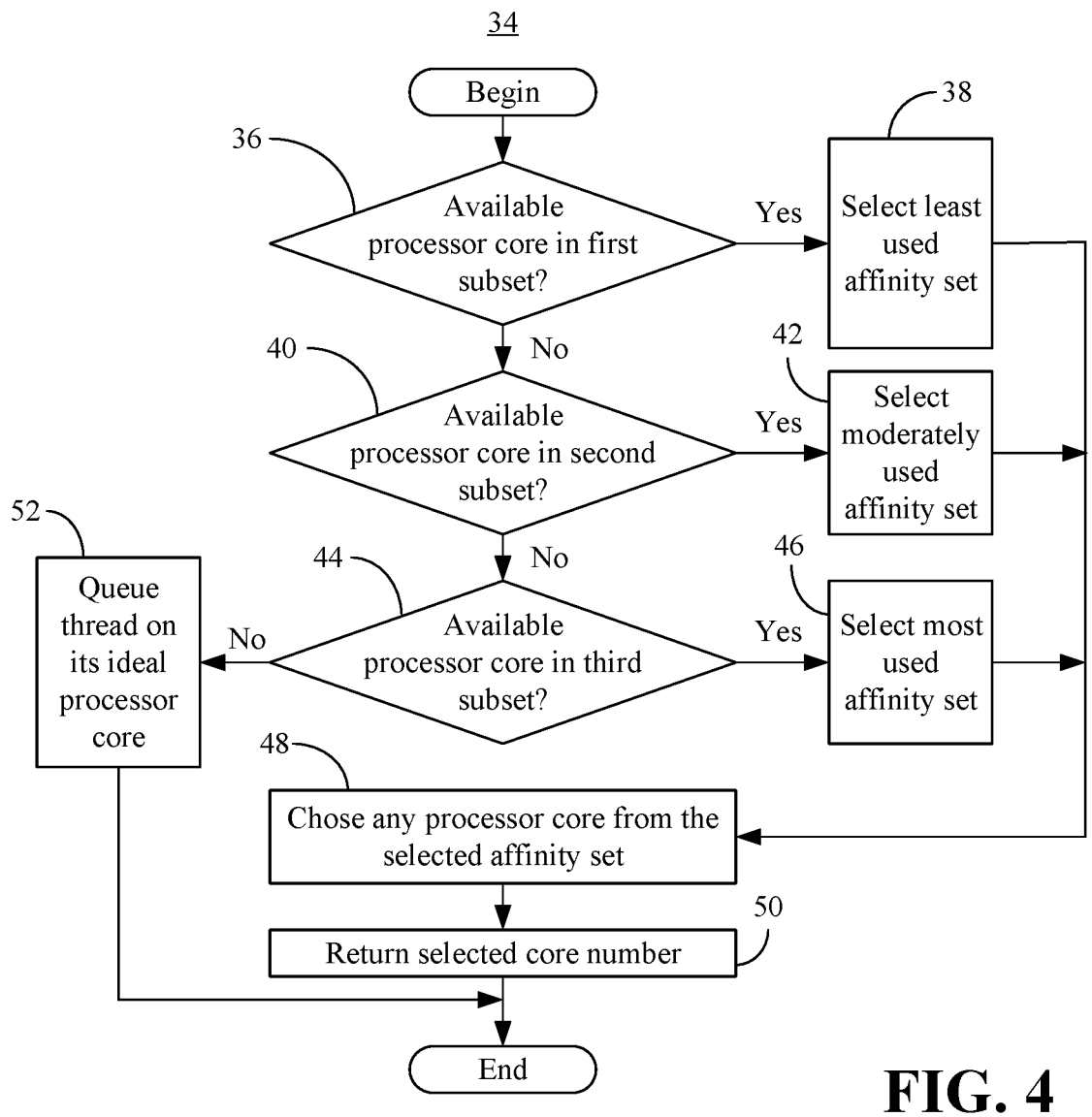
FIG. 4 is a flowchart of an example of a method of using affinity sets to schedule threads according to an embodiment.

FIG. 4 shows a method 34 of using affinity sets to schedule threads. The method 34 may generally be incorporated into block 26 (FIG. 2), already discussed. More particularly, the method 34 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 36 determines whether there is an available processor core in a first subset of the plurality of processor cores associated with relatively low active times. Block 36 may include performing an AND operation between a least used affinity bit mask such as, for example, the mask 30a (FIG. 3), and a bit array representing the available processor cores. If there is an available processor core in the first subset, a least used affinity set is selected at illustrated block 38.

If there are no available processor cores in the first subset, block 40 may determine whether there is an available processor core in a second subset of the plurality of processor cores associated with relatively moderate active times. In one example, block 40 includes performing an AND operation between a moderately used affinity bit mask such as, for example, the mask 30b (FIG. 3), and a bit array representing the available processor cores. If there is an available processor core in the second subset, a moderately used affinity set may be selected at block 42.

If there are no available processor cores in the second subset, illustrated block 44 determines whether there is an available processor core in a third subset of the plurality of processor cores associated with relatively high active times. Block 44 may include performing an AND operation between a most used affinity bit mask such as, for example, the mask 30c (FIG. 3), and a bit array representing the available processor cores. If there is an available processor core in the third subset, a most used affinity set is selected at illustrated block 46 and block 48 chooses any processor core from the selected affinity set. The selected processor core number may be returned at block 50. If it is determined at block 44 that there are no available processor cores in the third subset, block 52 queues the thread on its ideal processor core and the method terminates. The illustrated method 34 reduces the overhead associated with checking the active times of individual processor cores.

Figure 5:
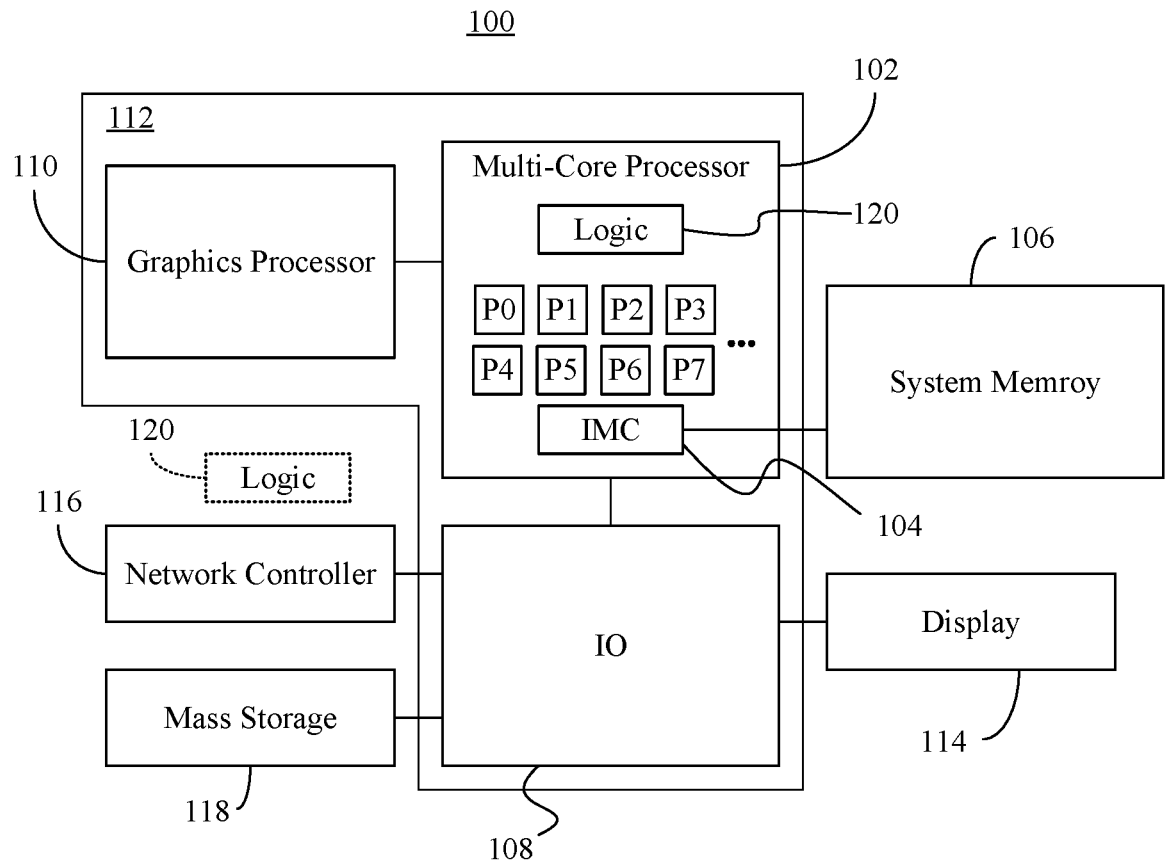
FIG. 5 is a block diagram of an example of a computing system that includes a system on chip according to an embodiment.

Turning now to FIG. 5, a performance-enhanced computing system 100 is shown. The computing system 100 may generally be part of an electronic device/platform having computing functionality (e.g., personal digital assistant/ PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), gaming functionality (e.g., networked multi-player console), etc., or any combination thereof. In the illustrated example, the system 100 includes a multi-core processor 102 (e.g., host processor(s), central processing unit(s)/CPU(s)) having an integrated memory controller (IMC) 104 that is coupled to a system memory 106. The multi-core processor 102 may include a plurality of processor cores P0-P7.

The illustrated system 100 also includes an input output (10) module 108 implemented together with the multi-core processor 102 and a graphics processor 110 on a semiconductor die 112 as a system on chip (SoC). The illustrated IO module 108 communicates with, for example, a display 114 (e.g., touch screen, liquid crystal display/LCD, light emitting diode/LED display), a network controller 116 (e.g., wired and/or wireless), and mass storage 118 (e.g., hard disk drive/HDD, optical disk, solid state drive/SSD, flash memory). The multi-core processor 102 may include logic 120 (e.g., logic instructions, configurable logic, fixed-functionality hardware logic, etc., or any combination thereof) to perform one or more aspects of the method 22 (FIG. 2) and/or the method 34 (FIG. 4), already discussed. Thus, the logic 120 may identify a thread and select a core from the plurality of processor cores P0-P7 in response to the selected core being available while satisfying a least used condition with respect to the plurality of processor cores P0-P7. In one example, the core is selected from cores of the same core type. Such an approach may be particularly advantageous in a heterogeneous processing environment. The logic 120 may also schedule the thread to be executed on the selected core. Scheduling the thread for execution may include, for example, updating a scheduling data structure to include the selected core, signaling the selection results to the selected core, activating one or more clock circuits and/or power rails associated with the selected core, and so forth. In one example, the logic 120 tracks active time for the plurality of processor cores P0-P7 and sorts the plurality of processor cores P0-P7 on an active time basis.

The least used condition may include either the selected core being associated with the lowest active time or the selected core being in a first subset of the plurality of processor cores P0-P7 associated with relatively low active times (e.g., below an absolute or percentage threshold). In one example, the least used condition further includes the selected core not being in the first subset and being in a second subset of the plurality of processor cores P0-P7 associated with relatively moderate active times. In yet another example, the least used condition further includes the selected core not being in the second subset and being in a third subset of the plurality of processor cores P0-P7 associated with relatively high active times.

Accordingly, the computing system 100 may be considered to be performance-enhanced to the extent that it provides a deterministic solution that prevents any one of the processor cores P0-P7 from wearing over time more quickly than the remaining processor cores P0-P7. As such, the illustrated processor cores P0-P7 experience enhanced performance (e.g., increased maximum frequency capability), reliability and/or efficiency. For example, connections are less likely to break down in the processor cores P0-P7 due to less cycling between expansion (e.g., due to current flow and heat) and contraction (e.g., due to cooling) in any one of the processor cores P0-P7. Additionally, frequency capping is less likely because processor wear and overheating is less of a concern. Although the illustrated logic 120 is located within the multi-core processor 102, the logic 120 may be located elsewhere in the computing system 100.

Figure 6:
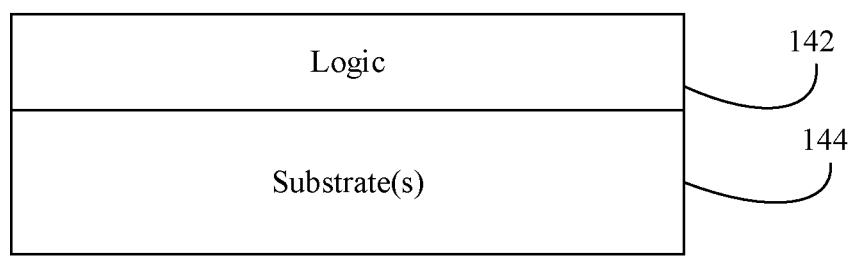
FIG. 6 is an illustration of an example of a semiconductor apparatus according to an embodiment.

FIG. 6 shows a semiconductor package apparatus 140. The illustrated apparatus 140 includes one or more substrates 144 (e.g., silicon, sapphire, gallium arsenide) and logic 142 (e.g., transistor array and other integrated circuit/ IC components) coupled to the substrate(s) 144. The logic 142 may be implemented at least partly in configurable logic or fixed-functionality logic hardware. In one example, the logic 142 implements one or more aspects of the method 22 (FIG. 2) and/or the method 34 (FIG. 4) and may be readily substituted for the logic 120 (FIG. 5), already discussed. Thus, the logic 142 may identify a thread and select a core from the plurality of processor cores in response to the selected core being available while satisfying a least used condition with respect to the plurality of processor cores. The logic 120 may also schedule the thread to be executed on the selected core. In one example, the logic 120 tracks active time for the plurality of processor cores and sorts the plurality of processor cores on an active time basis. In one example, the logic 142 includes transistor channel regions that are positioned (e.g., embedded) within the substrate(s) 144. Thus, the interface between the logic 142 and the substrate(s) 104 may not be an abrupt junction. The logic 142 may also be considered to include an epitaxial layer that is grown on an initial wafer of the substrate(s) 144.

Figure 7:
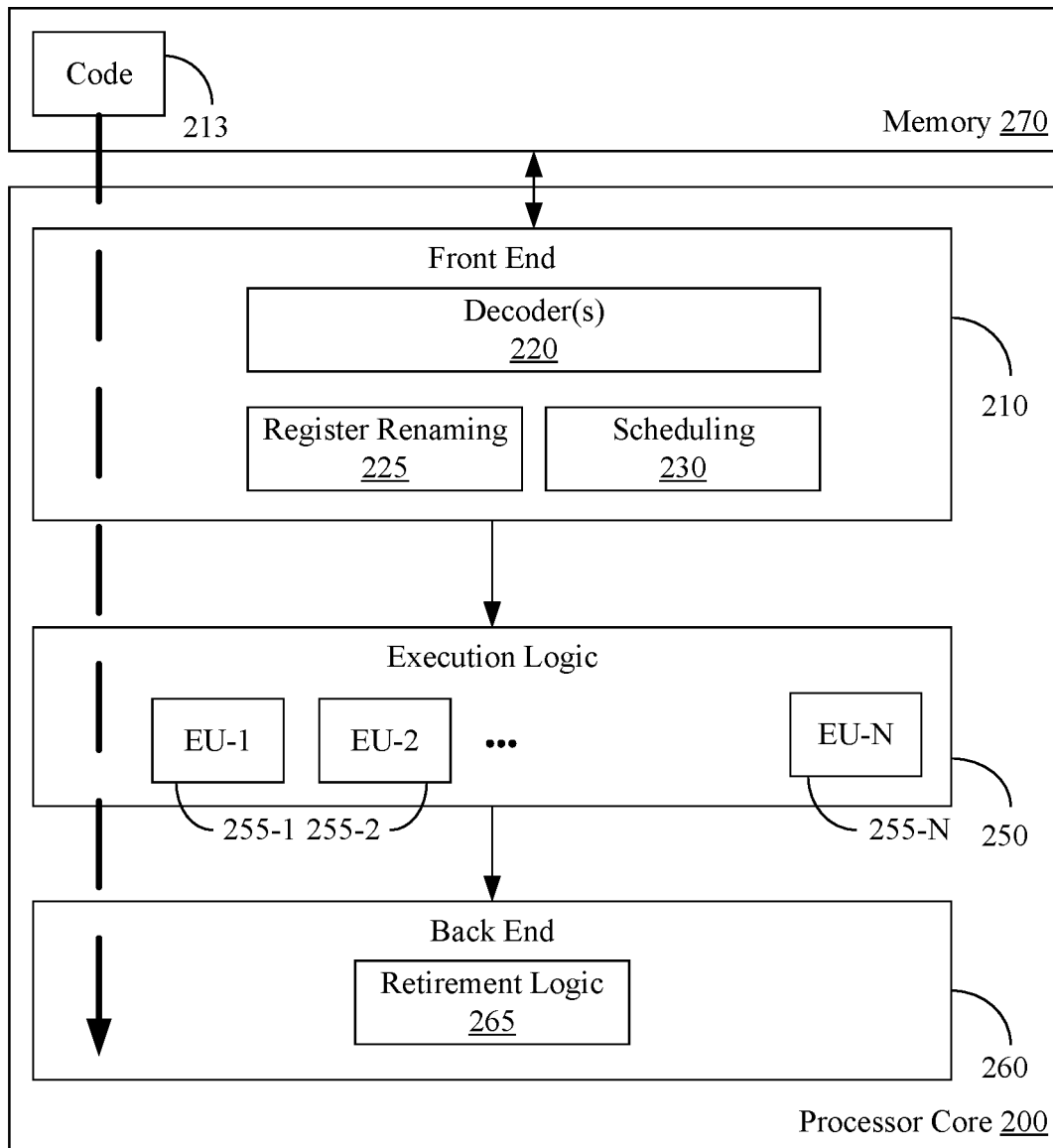
FIG. 7 is a block diagram of an example of a processor according to an embodiment.

FIG. 7 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 7, a processing element may alternatively include more than one of the processor core 200 illustrated in FIG. 7. The processor core 200 may be a single-threaded core or, for at least one embodiment, the processor core 200 may be multithreaded in that it may include more than one hardware thread context (or "logical processor") per core.

FIG. 7 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the method 22 (FIG. 2) and/or the method 34 (FIG. 4), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions.

Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 7, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 8:
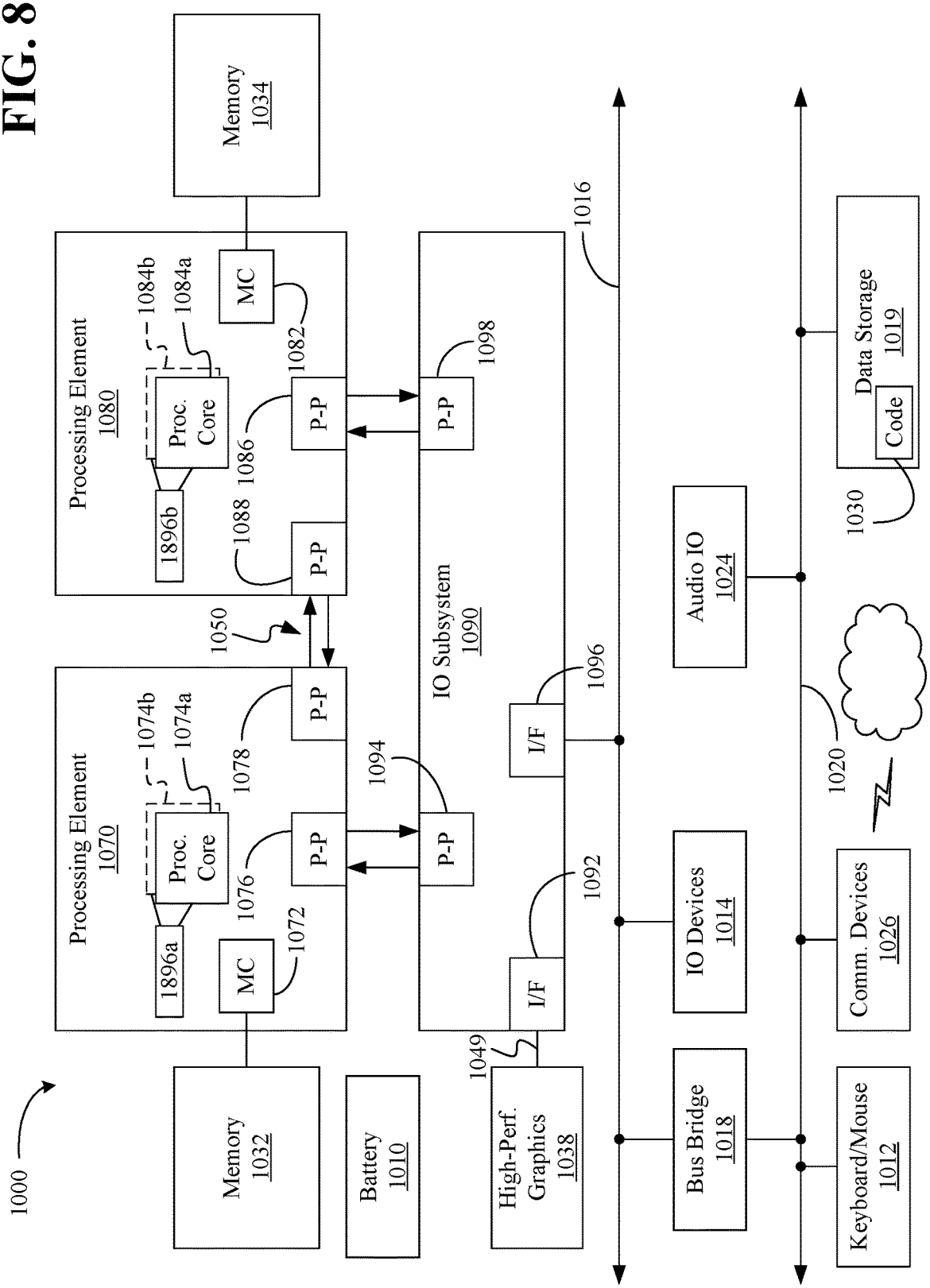
FIG. 8 is a block diagram of an example of a multi-processor based computing system according to an embodiment.

Referring now to FIG. 8, shown is a block diagram of a computing system 1000 embodiment in accordance with an embodiment. Shown in FIG. 8 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 8 may be implemented as a multi-drop bus rather than point-to-point interconnect.

As shown in FIG. 8, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 7.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 8, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 8, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 8, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement one or more aspects of the method 22 (FIG. 2) and/or the method 34 (FIG. 4), already discussed. Further, an audio I/O 1024 may be coupled to second bus 1020 and a battery 1010 may supply power to the computing system 1000.

Note that other embodiments are contemplated. For example, instead of the point-to-point architecture of FIG. 8, a system may implement a multi-drop bus or another such communication topology. Also, the elements of FIG. 8 may alternatively be partitioned using more or fewer integrated chips than shown in FIG. 8.

ADDITIONAL NOTES AND EXAMPLES

Example 1 may include a performance-enhanced computing system comprising a network controller, a host processor coupled to the network controller, and a memory coupled to the host processor, the memory including executable program instructions, which when executed by the host processor, cause the computing system to identify a thread, select a core from a plurality of processor cores in response to the selected core being available while satisfying a least used condition with respect to the plurality of processor cores, and schedule the thread to be executed on the selected core.

Example 2 may include the computing system of Example 1, wherein the executable program instructions, when executed by the computing system, cause the computing system to track active time for the plurality of processor cores.

Example 3 may include the computing system of Example 1, wherein the executable program instructions, when executed by the computing system, cause the computing system to sort the plurality of processor cores on an active time basis.

Example 4 may include the computing system of any one of Examples 1 to 3, wherein the least used condition includes either the selected core being associated with a lowest active time or the selected core being in a first subset of the plurality of processor cores associated with relatively low active times.

Example 5 may include the computing system of Example 4, wherein the least used condition further includes the selected core not being in the first subset and being in a second subset of the plurality of processor cores associated with relatively moderate active times.

Example 6 may include the computing system of Example 5, wherein the least used condition further includes the selected core not being in the second subset and being in a third subset of the plurality of processor cores associated with relatively high active times.

Example 7 may include a semiconductor apparatus comprising one or more substrates, and logic coupled to the one or more substrates, wherein the logic is implemented at least partly in one or more of configurable logic or fixed-functionality hardware logic, the logic coupled to the one or more substrates to identify a thread, select a core from a plurality of processor cores in response to the selected core being available while satisfying a least used condition with respect to the plurality of processor cores, and schedule the thread to be executed on the selected core.

Example 8 may include the semiconductor apparatus of Example 7, wherein the logic coupled to the one or more substrates is to track active time for the plurality of processor cores.

Example 9 may include the semiconductor apparatus of Example 7, wherein the logic coupled to the one or more substrates is to sort the plurality of processor cores on an active time basis.

Example 10 may include the semiconductor apparatus of any one of Examples 7 to 9, wherein the least used condition includes either the selected core being associated with a lowest active time or the selected core being in a first subset of the plurality of processor cores associated with relatively low active times.

Example 11 may include the semiconductor apparatus of Example 10, wherein the least used condition further includes the selected core not being in the first subset and being in a second subset of the plurality of processor cores associated with relatively moderate active times.

Example 12 may include the semiconductor apparatus of Example 11, wherein the least used condition further includes the selected core not being in the second subset and being in a third subset of the plurality of processor cores associated with relatively high active times.

Example 13 may include the semiconductor apparatus of Example 7, wherein the logic coupled to the one or more substrates includes transistor channel regions that are positioned within the one or more substrates.

Example 14 may include at least one computer readable storage medium comprising a set of executable program instructions, which when executed by a computing system, cause the computing system to identify a thread, select a core from a plurality of processor cores in response to the selected core being available while satisfying a least used condition with respect to the plurality of processor cores, and schedule the thread to be executed on the selected core.

Example 15 may include the at least one computer readable storage medium of Example 14, wherein the executable program instructions, when executed by the computing system, cause the computing system to track active time for the plurality of processor cores.

Example 16 may include the at least one computer readable storage medium of Example 14, wherein the executable program instructions, when executed by the computing system, cause the computing system to sort the plurality of processor cores on an active time basis.

Example 17 may include the at least one computer readable storage medium of any one of Examples 14 to 16, wherein the least used condition includes either the selected core being associated with a lowest active time or the selected core being in a first subset of the plurality of processor cores associated with relatively low active times.

Example 18 may include the at least one computer readable storage medium of Example 17, wherein the least used condition further includes the selected core not being in the first subset and being in a second subset of the plurality of processor cores associated with relatively moderate active times.

Example 19 may include the at least one computer readable storage medium of Example 18, wherein the least used condition further includes the selected core not being in the second subset and being in a third subset of the plurality of processor cores associated with relatively high active times.

Example 20 may include a method comprising identifying a thread, selecting a core from a plurality of processor cores in response to the selected core being available while satisfying a least used condition with respect to the plurality of processor cores, and scheduling the thread to be executed on the selected core.

Example 21 may include the method of Example 20, further including tracking active time for the plurality of processor cores.

Example 22 may include the method of Example 20, further including sorting the plurality of processor cores on an active time basis.

Example 23 may include the method of any one of Examples 20 to 22, wherein the least used condition includes either the selected core being associated with a lowest active time or the selected core being in a first subset of the plurality of processor cores associated with relatively low active times.

Example 24 may include the method of Example 23, wherein the least used condition further includes the selected core not being in the first subset and being in a second subset of the plurality of processor cores associated with relatively moderate active times.

Example 25 may include the method of Example 24, wherein the least used condition further includes the selected core not being in the second subset and being in a third subset of the plurality of processor cores associated with relatively high active times.

Thus, technology described herein may provide higher single core turbo frequencies and improved single threaded performance by augmenting thread scheduling with temporal characteristics. This increase in frequency is achieved without any negative impact on reliability. Indeed, because thread migrations typically happen infrequently, any associated frequency ramp time latency or reductions in cache hit rates may have a negligible impact on performance.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
   a network controller;
   a host processor coupled to the network controller, the host processor including a plurality of processor cores; and
   a memory coupled to the host processor, the memory including executable program instructions, which when executed by the host processor, cause the computing system to:
   identify a thread;
   conduct an identification that there is at least one available processor core at a first subset of the plurality of processor cores based on a comparison of a first affinity mask to an array that is to indicate availability information of the plurality of processor cores, wherein the first affinity mask is to represent the first subset of the plurality of processor cores that is to be associated with relatively low active times;
   select an available processor core from the first subset of the plurality of processor cores in response to the identification; and
   schedule the thread to be executed on the selected processor core.

2. The computing system of claim 1, wherein the executable program instructions, when executed by the computing system, cause the computing system to track active times for the plurality of processor cores.

3. The computing system of claim 1, wherein the executable program instructions, when executed by the computing system, cause the computing system to sort the plurality of processor cores on an active time basis.

4. The computing system of claim 1, wherein the selected processor core is to be associated with a lowest active time.

5. The computing system of claim 1, wherein the executable program instructions, when executed by the computing system, cause the computing system to identify a second affinity mask that is to represent a second subset of the plurality of processor cores that is to be associated with relatively moderate active times.

6. The computing system of claim 5, wherein the executable program instructions, when executed by the computing system, cause the computing system to identify a third affinity mask that is to represent a third subset of the plurality of processor cores that is to be associated with relatively high active times.

7. A semiconductor apparatus comprising:
   one or more substrates; and
   logic coupled to the one or more substrates, wherein the logic is implemented at least partly in one or more of configurable; logic or fixed-functionality logic hardware, the logic coupled to the one or more substrates to:
   identify a thread;
   conduct an identification that there is at least one available processor core at a first subset of a plurality of processor cores based on a comparison of a first affinity mask to an array that is to indicate availability information of the plurality of processor cores, wherein the first affinity mask is to represent the first subset of the plurality of processor cores that is to be associated with relatively low active times;

select an available processor core from the first subset of the plurality of processor cores in response to the identification; and schedule the thread to be executed on the selected processor core.

8. The semiconductor apparatus of claim 7, wherein the logic coupled to the one or more substrates is to track active times for the plurality of processor cores.

9. The semiconductor apparatus of claim 7, wherein the logic coupled to the one or more substrates is to sort the plurality of processor cores on an active time basis.

10. The semiconductor apparatus of claim 7, wherein the selected processor core is to be associated with a lowest active time.

11. The semiconductor apparatus of claim 7, wherein the logic coupled to the one or more substrates is to identify a second affinity mask that is to represent a second subset of the plurality of processor cores that is to be associated with relatively moderate active times.

12. The semiconductor apparatus of claim 11, wherein the logic coupled to the one or more substrates is to identify a third affinity mask that is to represent a third subset of the plurality of processor cores that is to be associated with relatively high active times.

13. The semiconductor apparatus of claim 7, wherein the logic coupled to the one or more substrates includes transistor channel regions that are positioned within the one or more substrates.

14. At least one non-transitory computer readable storage medium comprising a set of executable program instructions, which when executed by a computing system, cause the computing system to:

identify a thread;

conduct an identification that there is a least one available processor core at a first subset of a plurality of processor cores based on a comparison of a first affinity mask to an array that is to indicate availability information of the plurality of processor cores, wherein the first affinity mask is to represent the first subset of the plurality of processor cores that is to be associated with relatively low active times;

select an available processor core from the first subset of the plurality of processor cores in response to the identification; and schedule the thread to be executed on the selected processor core.

15. The at least one non-transitory computer readable storage medium of claim 14, wherein the executable program instructions, when executed by the computing system, cause the computing system to track active times for the plurality of processor cores.

16. The at least one non-transitory computer readable storage medium of claim 14, wherein the executable program instructions, when executed by the computing system, cause the computing system to sort the plurality of processor cores on an active time basis.

17. The at least one non-transitory computer readable storage medium of claim 14, wherein the selected processor core is to be associated with a lowest active.

18. The at least one non-transitory computer readable storage medium of claim 14, wherein the executable program instructions, when executed by the computing system, cause the computing system to identify a second affinity mask that is to represent a second subset of the plurality of processor cores that is to be associated with relatively moderate active times.

19. The at least one non-transitory computer readable storage medium of claim 18, wherein the executable program instructions, when executed by the computing system, cause the computing system to identify a third affinity mask that is to represent a third subset of the plurality of processor cores that is to be associated with relatively high active times.

20. A method comprising:

identifying a thread;

conducting an identification that there is a least one available processor core at a first subset of a plurality of processor cores based on a comparison of a first affinity mask to an array that is to indicate availability information of the plurality of processor cores, wherein the first affinity mask represents the first subset of the plurality of processor cores that is to be associated with relatively low active times;

selecting an available processor core from the first subset of the plurality, of processor cores in response to the identification; and scheduling the thread to be executed on the selected processor core.

21. The method of claim 20, further including tracking active times for the plurality of processor cores.

22. The method of claim 20, further including sorting the plurality of processor cores on an active time basis.

23. The method of claim 20, wherein the selected processor core is associated with a lowest active time.

24. The method of claim 23, further including identifying a second affinity mask that is to represent a second subset of the plurality of processor cores that is associated with relatively moderate active times.

25. The method of claim 24, further including identifying a third affinity mask that is to represent a third subset of the plurality of processor cores that is associated with relatively high active times.

* * * * *